United States Patent
Couwenberg et al.

(10) Patent No.: US 7,154,624 B2
(45) Date of Patent: Dec. 26, 2006

(54) SYSTEM FOR CARRYING OUT JOBS ON DOCUMENTS

(75) Inventors: Wilhelmus Johannes Couwenberg, Boekel (NL); Roelof Hamberg, Venlo (NL)

(73) Assignee: Oce-Technologies B.V., Venlo (NL)

( * ) Notice: Subject to any disclaimer, the term of this patent is extended or adjusted under 35 U.S.C. 154(b) by 968 days.

(21) Appl. No.: 10/141,856

(22) Filed: May 10, 2002

(65) Prior Publication Data
US 2003/0058468 A1 Mar. 27, 2003

(30) Foreign Application Priority Data
May 11, 2001 (EP) .................................. 01201731

(51) Int. Cl.
G06F 15/00 (2006.01)

(52) U.S. Cl. ..................................... 358/1.15; 358/468

(58) Field of Classification Search ............... 358/1.12, 358/1.13, 1.15, 468, 1.14
See application file for complete search history.

(56) References Cited

U.S. PATENT DOCUMENTS

| | | | |
|---|---|---|---|
| 5,878,196 A | 3/1999 | Suzuki | 358/1.15 |
| 5,995,721 A | 11/1999 | Rourke et al. | 358/1.13 |

*Primary Examiner*—Gabriel I. Garcia
(74) *Attorney, Agent, or Firm*—Birch, Stewart, Kolasch, and Birch, LLP

(57) ABSTRACT

A system for carrying out jobs on documents is disclosed. The system includes a scanner, a printer and a controller. The controller comprises client modules for receiving jobs, a splitter module for splitting a job in a number of subjobs, worker modules for carrying out subjobs, and a central storage area. A document is stored according to a document model in the central storage area. According to the document model a state is assigned to the document. A state being made up by values of atributes. For carrying out a job, a document has to be brought from a source state to a target state. In a particular embodiment, splitting of a job is carried out by identifying attributes that have different values in the source state and the target state and selecting worker modules that are able to act on these attributes.

11 Claims, 5 Drawing Sheets

SYSTEM FOR CARRYING OUT JOBS ON DOCUMENTS

RELATED APPLICATION

The present application claims the benefit of European Patent Application No. 01201731.5 filed May 11, 2001, under 35 U.S.C. § 119, which is herein fully incorporated by reference.

BACKGROUND OF THE INVENTION

1. Field of the Invention

The present invention relates to a system for carrying out jobs on documents, comprising transformation units that in cooperation generate a target document from an input document and a method for use in such a system.

2. Discussion of the Related Art

Nowadays, architectures of document processing systems for carrying out jobs comprise modules that each carry out a specific task on a document for carrying out a requested job. For instance, for executing a copy job, an original document is scanned by a scanner module, the resulting bitmaps are zoomed, rotated, ameliorated by image processing modules, and these bitmaps again are sent to a printing module for delivering the desired copies of the original document. The division over available modules of the work that has to be done to carry out the job is made based on the knowledge implicitly resident in the system. This knowledge is related to internal and external dependecies of the modules. Above that, such an architecture is built with certain assumptions on how jobs are formed. But, this results in a rigid system with a severe restriction for accomodating new functionality in such a system.

SUMMARY OF THE INVENTION

An object of the present invention is to obviate the above described disadvantages and other problems associated with the related art.

Another object of the present invention is to provide an improved system for carrying out jobs on documents.

To this end, the document processing system according to an embodiment of the present invention is improved such that a document is stored according to a document model as a structure of components; a component has a component state assigned and a document has a document state assigned, the document state comprising component states; the transformation units having the abiltiy to bring a a component from a first state into a second state; and in that the system further comprises: means for composing a digraph of transformation units that is able to transform components of a document in such a way that the document is brought from the source document state to the target document state; and means for managing the processing of components by transformation units according to the digraph of transformation units.

This leads to a versatile system that is easy to adapt and eacy to cope with any new requirements.

In an advantageous embodiment, a transformation unit has a cost attribute and the means for composing the digraph has means for calculating the total cost of a digraph based on the cost attributes of transformation units comprised in the digraph. The means for composing a digraph of transformation units has means for returning a digraph with minimum total costs.

By manipulating cost attributes of transformation units, it is now possible to influence which transformation units are involved in the processing of a job. In this way, an optimal load distribution between transformation units can be obtained.

In a further embodiment according to the invention, the system comprises clients for inputting a document and a job to be carried out on the document, and the means for composing carries out the following steps: determining the state of components making up the source document, determining the state of components making up the target document identifying attributes that have to be changed, identifying transformation units that change at least one of the identified attributes, determining the resulting set of states, comparing the resulting set of states with the state of components making up the target document, and repeating the step of identifying attributes that have to be changed, the step of dentifying transformation units and the step of comparing, until the comparison is fullfilled whereafter the resulting digraph of transformation units is returned.

This leads to a fast converging process for the determination of involved transformation units.

BRIEF DESCRIPTION OF THE DRAWINGS

The invention will be explained in detail with reference to the accompanying drawings wherein.

DESCRIPTION OF THE PREFERRED EMBODIMENTS

Architecture

Figure 1:
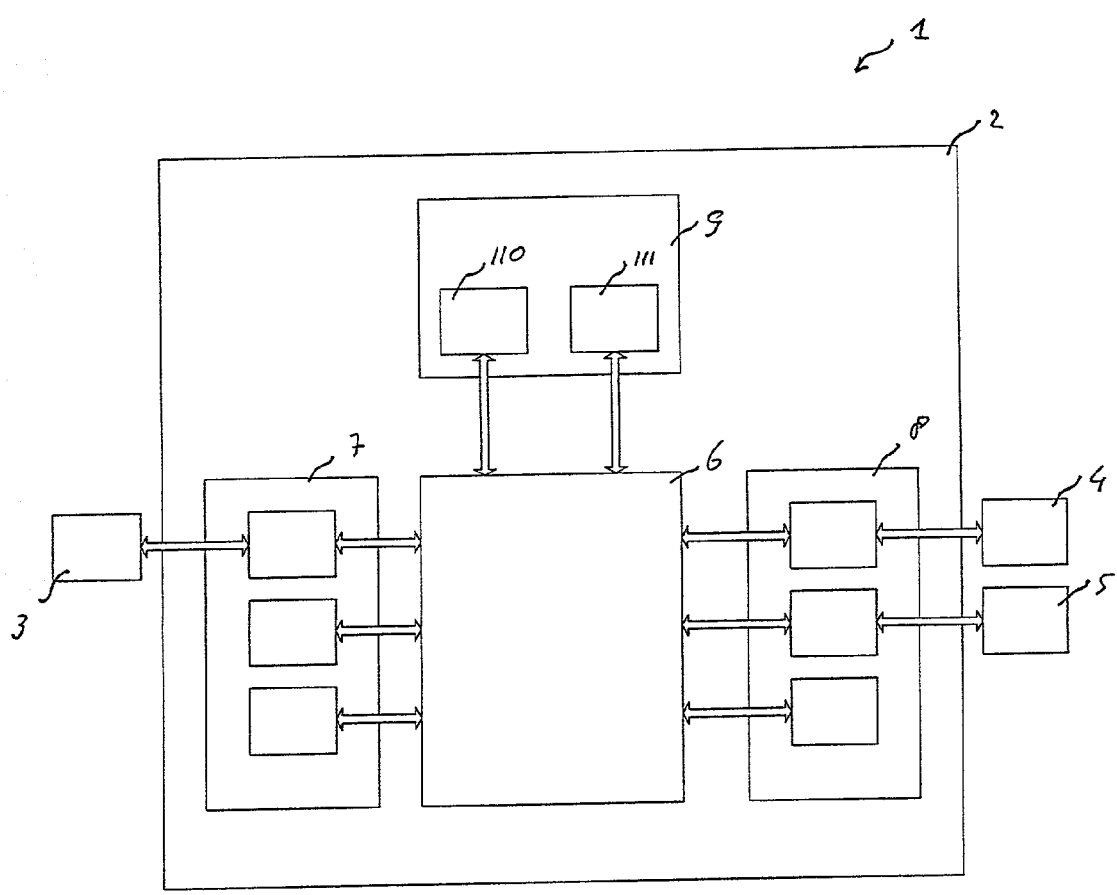
FIG. 1 shows a block diagram depicting an architecture of a system according to an embodiment of the present invention.

FIG. 1 shows an overview of an architecture of a system 1 for carrying out jobs on documents according to an embodiment of the present invention. The system 1 comprises a controller 2 operatively connected to a graphical terminal 3 for user interaction, and operatively connected to a scanner engine 4 and a printer engine 5. The controller 2 comprises an information blackboard 6, a number of clients 7, a number of transformation units also referred to herein as 'workers' 8, and a workflow management module 9.

The information blackboard 6 is a central repository of optionally persistent objects representing what the system has to do, as well as global configuration and state information. It contains all information that is shared between the other modules of the controller 2.

In the present invention, modules in the system do not communicate with each other. Each module reacts on information in the information blackboard 6 and each module updates information in the information blackboard 6. This enables a loose coupling between the modules, unnecesary dependencies between the modules are avoided, and a high degree of modularity is reached. In this way it is possible to add an extra component with only minor modifications at well defined places.

Clients 7 receive jobs from the outside, e.g., through the terminal 3 or through a network client, place these jobs in the information blackboard 6, and return information about the status of the job to the outside. These jobs are implemented as objects named "client jobs". Workers 8 carry out activities to perform execution of jobs. Such activities will further be described by objects named "worker jobs". The workflow management module 9 carries out controlling tasks and includes a scheduler 110 and a splitter 111. The scheduler 110 controls the dynamical aspects of the system such as intiating and controlling execution of jobs. The splitter 111 breaks down client jobs into worker jobs.

Information Blackboard

Figure 2:
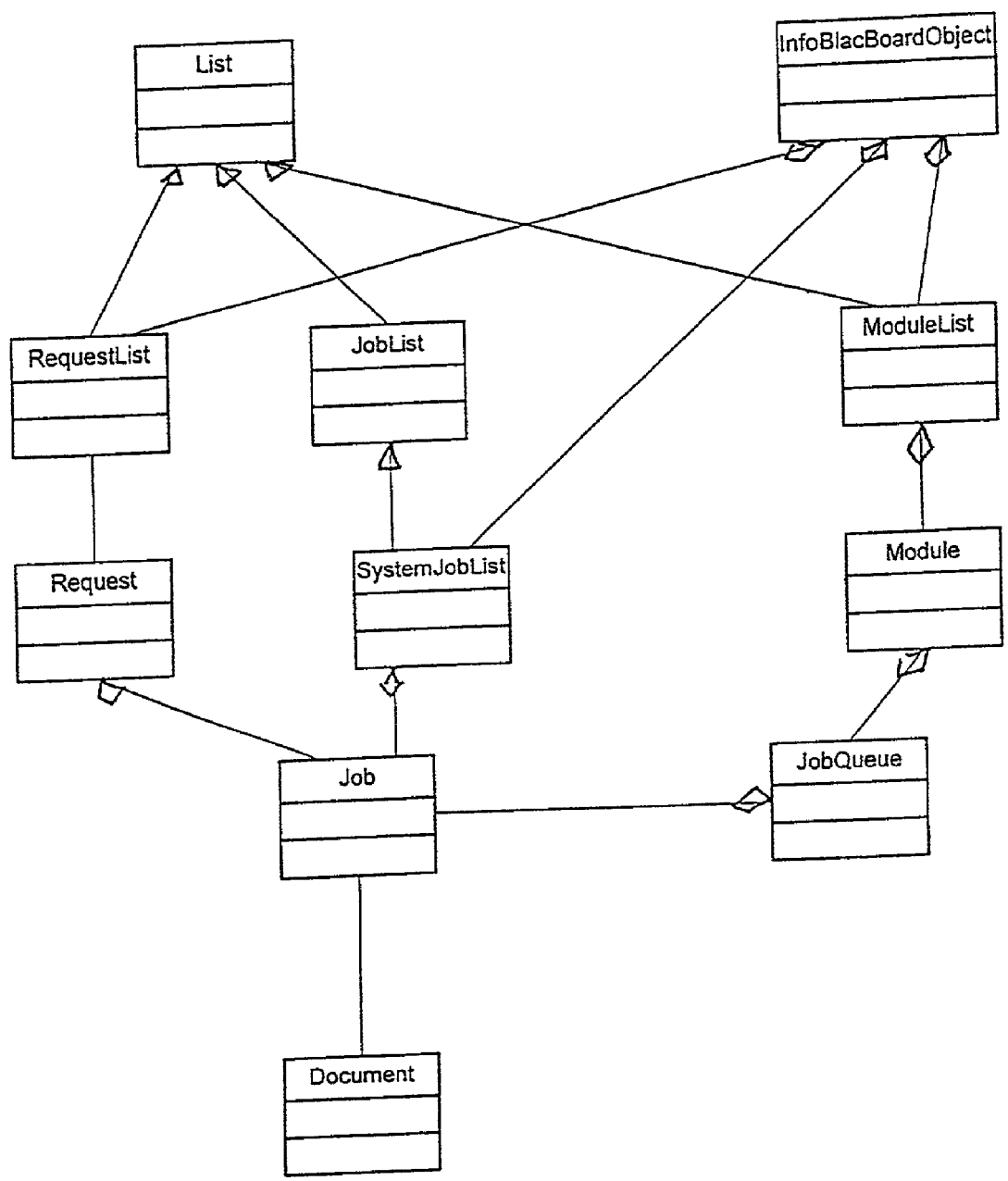
FIG. 2 is a class diagram for showing elements in an information blackboard according to an embodiment of the present invention.

The information blackboard 6 is a central data storage means that is responsible for keeping all information which has a scope larger than a scope of a single worker or a single client. This information includes the description of jobs, documents, engine status information, configurations, etc. FIG. 2 shows a class diagram showing relations for objects resident at a certain instance in the information blackboard 6 of the system 1.

As shown in FIG. 2, a number of classes in the class list "List" include a RequestList, a JobList, and a ModuleList. For user requests, the highest level in the job submission and control hierarchy, the RequestList has been included. This RequestList shows references to all requests (Request) in the system. Under the JobList, a SystemJobList identifies the list of all jobs (Job) in the system. This includes both the user-defined client jobs as well as the subjobs derived after decomposition. If a new client job is added, the new job is placed in the SystemJobList after which the scheduler 110 will place it in the queue for the splitter 111. After decomposition (i.e., splitting of the job into subjobs), the splitter 111 will place the newly created subjobs in the SystemJobList. The scheduler 110 is notified by that action after which it schedules the subjobs towards the appropriate queue or list.

The right side of the class diagram in FIG. 2 shows all classes related to job modules (worker/client/splitter). The ModuleList contains references to all Module objects in the information blackboard 6. To each job processing module, a Module object is attached, specifying its status as well as being the object referencing to all other information objects belonging to this module, like jobqueue, configuration and supplies (e.g. paper tray contents). Thus each client and worker is represented by a Module object in this diagram, which has a reference to a job queue belonging to this module. In the JobQueue, all active (processing or waiting for automatic start) jobs are ordered according to the order of processing. The InfoBlackBoardObject includes the RequestList, the SystemJobList, and the ModuleList.

The information blackboard 6 comprises a subscription and notification mechanism for new tasks and information changes. Clients can subscribe on these changes and are in this way able to monitor document and worker states.

Clients

A client 7 receives jobs entered by a user. It puts a job in the SystemJobList. Once the job is split into several subjobs, the client is able to read the status of all subjobs seperately. A Request entered by the user is placed in the RequestList. The client may change the status of the whole job. This change then holds for all subjobs. Examples of client modules are a local user interface module and a networked job submission module.

Splitter

The splitter module 111 is responsible for the creation of subjobs, which together make up a job as required by a user. The splitter has access to its job-queue, also named "splitterqueue", on the information blackboard and starts splitting these jobs in the same order as in which they are placed in this queue. As a result of the splitting activity, the splitter creates a set of subjobs. It puts the subjobs in the SystemJobList. In case the initial steps of the job can be done independently and thus parallel, the splitter will create more than one worker job for these initial steps. The splitter looks up information regarding available workers in a table stored in the information blackboard 6.

Scheduler

The scheduler 110 ensures that all jobs are assigned to workers. Worker jobs created by the splitter 111 are assigned to available workers 8 in order to execute the already known actions required to perform the client jobs. For each worker, worker jobs are placed in a queue. The scheduler 110 is the only component responsible for putting jobs in a queue or removing them from a queue. The job assignment is done taking into account the attributes of the worker jobs and of the client jobs they originate from, whether the worker can accept more worker jobs, and the availability of multiple instances of the same worker type. The scheduler 110 is also responsible for suspending or canceling the appropriate worker jobs under special circumstances when the system changes state. The scheduler 110 decides the order in which the jobs are processed. The scheduling strategy for the scheduler 110 can however be specified in the information blackboard 6. These settings are user configurable. The scheduler 110 translates the scheduling attributes for the entire job into the scheduling attributes for the subjobs.

Worker

Workers 8 are either software layers that are connected to physical devices, e.g., a scanner or a printer, or software modules that carry out specific tasks, like ripping a PostScript File. Each worker has an associated worker job queue. The order in the worker job queue is the order in which the worker must produce the results. Also each worker has a worker state object on the information blackboard 6 that it is used to read or write its global state. A worker may be in one of the following states: idle state, running state, suspended state, and suspend pending state. Methods for the work job queue are: add a worker job at a spedific location in the list and remove a worker job from the list. Different states of a worker job are: created, assigned, active, done, failed, canceled and stopped.

If a subjob is ready, the subjob stays in the worker job queue with the status ready. The worker is not responsible for removing or adding a job to the worker job queue.

If the job has to be stopped or suspended in response to a user request specified by some information in the information blackboard, the worker responds to the request. The worker will properly handle such a request. If the job is suspended or stopped, the worker changes the status of the subjob.

Examples of workers 8 include, but are not limited to, an interpreter module, a scan module, and a print module.

A worker job comprises a description of actions to be performed by a worker, references to input objects to retrieve from the information blackboard, and references to the output objects to be produced by the worker.

Document Model

Figure 3:
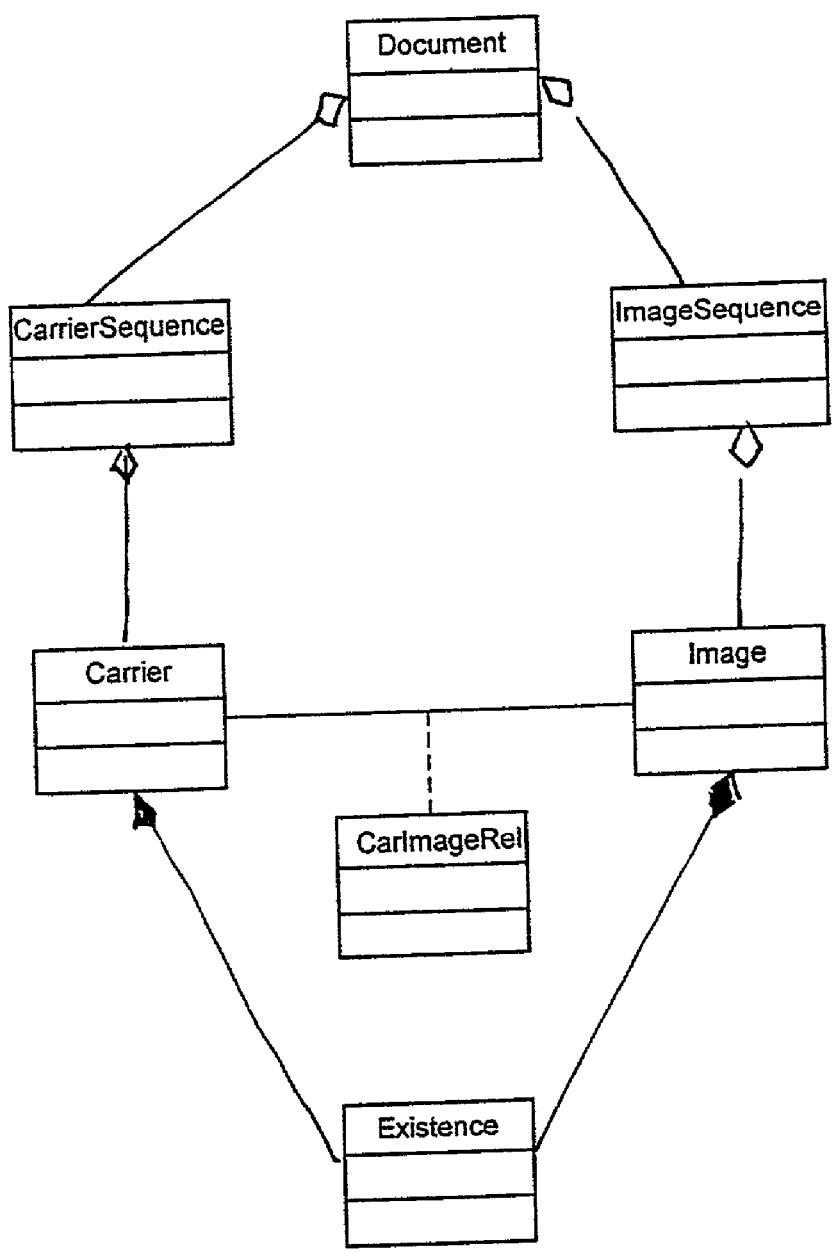
FIG. 3 is a class diagram for showing a document model according to an embodiment of the present invention.

A document is stored in the system 1 according to a document model. The document model is explained with reference to FIG. 3. The document model comprises a number of related components. Component types are: image, carrier and image carrier relationship. When reproducing documents from an original document it is observed that the original document and a copy of it share the same images in the same sequence of imagess (ImageSequence); e.g. a booklet and a simplex version of the same document share the same image sequence and the same images, allthough the appearances may be different. This is taken as the starting point for the dynamics of the model. Adding an image in the original document has the implication that the same image also must be added in the related copy document. This is the case, e.g., when a next orignal is detected in the input tray of the Scanner.

Based on the above the document is considered as a sequence of images on a sequence of carriers (CarrierSequence), where carriers can be sheets or bitmap files. So basic document objects are: Carrier, Image and CarImageRel. The latter object "CarImageRel" defines how a carrier and an image are related. By way of example two cases are given. In a first case, two identical images of A4 format are positioned side by side on one face of an A3 paper sheet. (Such a configuration is usefull for producing two copy sets simultaneously where, after delivery, the resulting A3 set is cut in two A4 sets.) This configuration is represented in the document model by two carrierImageRelationship objects, one with a position attribute 'left' and the other with a position attribute 'right' between the carrier object on one side and the image object at the other side. In a second case, modelling a duplex document, a first image is connected to a carrier object by means of a first carrierImageRelationship object, with a 'front' attribute and a next image is connected to the same carrier object by a second carrierImageCarrierRelationship object with an attribute 'rear'.

On different levels different attributes exist. On a document level, attributes concerning the whole document are available. These can be handled by a jobticketparser, a jobticket generator and a pdl-interpreter. The last is able to transform a document on this level towards the image and carrier level. On the image and carrier level, images and carriers are presented by single objects. On this level, the basic scanner works. Also on this level, activities are synchronized by notification mechanisms per single image object resulting in a maximum productivity and minimized response time.

Application of the document model is particularly advantageous when used in combination with the information black board, since all architechtural components have access to the information black board and all access the same model, so that no direct communication is needed both between worker-level and client-level and between individual workers.

Job Model

A job refers to a target document that must be created. This target document includes references to source documents delivering the sequence of images needed for creating that target document. These references or ImageSequence relations between the target document and its source document form the basis for the dynamics of the model.

To accomodate job requirements, the document model is such that besides that a real document, as it is, is accomodated also within the same document model, a document recipe and a document specification may be expressed in the document model. The document recipe holds the intial description of the expected result, and this description is independent of the actual source document. The document specification describes the document's exact appearance, and it gives an exact specification of what must be made. To be able to acommodate all these aspects of a document in one and the same tree, an existence attribute is added for image, and optionally for carrier objects. This existence attribute ("Existence" in FIG. 3) may have the value: recipe, specified and real to indicate to what aspect the data at hand belong. This is possible since for workers at any moment each part of a document has only one relevant state.

Figure 4:
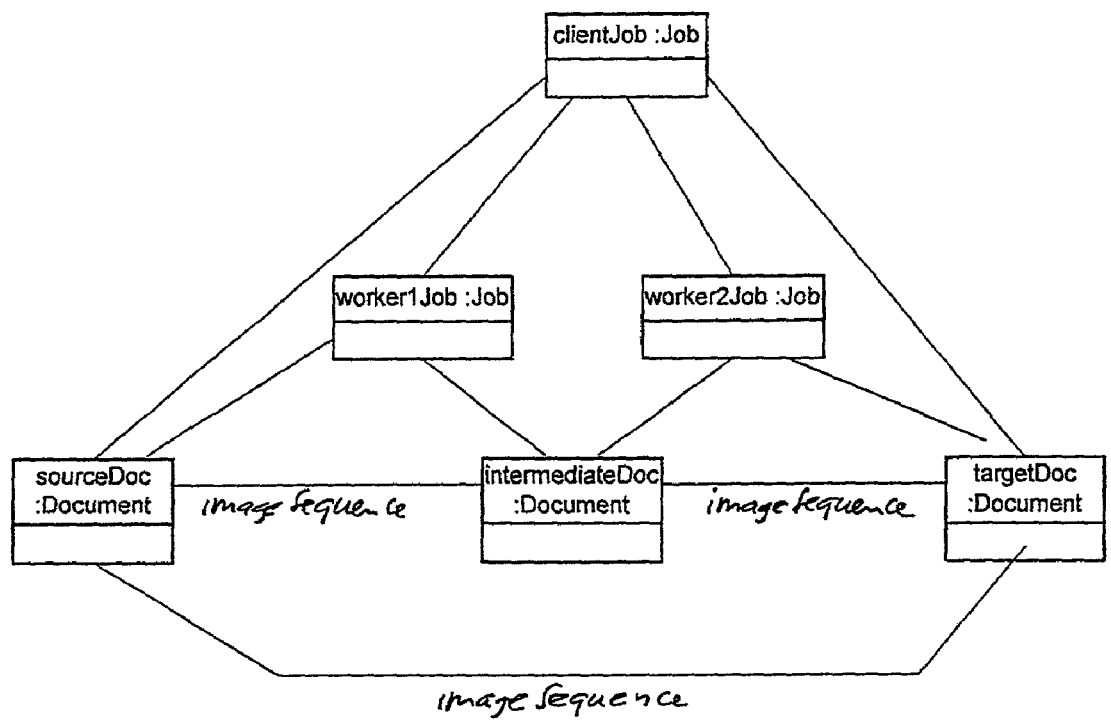
FIG. 4 is an object diagram illustrating objects involved in a job according to an embodiment of the present invention.

A client job expresses the command to create a target document from a source document as formulated by the client. This job will be split in worker jobs that will be handled by various workers. FIG. 4 shows the relations between a client job, worker jobs and related documents according to an embodiment of the present invention.

Thus, the document model according to the invention, preferably embodied as a computer implemented data structure, comprises at least one carrier sequence and at least one image sequence, a carrier sequence comprising at least one carrier and an image sequence comprising at least one image, at least one carrier image relationship indicating an association between one carrier and one image and an existence parameter associated with each image.

It is advantageous to assign a value to the existence parameter chosen from the domain recipe, specified and real.

Application of the document model disclosed here is advantageous in that the model accomodates equally the document as a whole as well as all document components, accomodates a document during all production steps necessary for the processing of the job; accomodates equally the document in all of its manifestations, be it in electronic form or on hard copy; accomodates equally a recipie, a full specification, or a realization of the document. As a consequence of the above, during processing the document is described all the time in the same document model, so that no conversions are needed from one format to another format during processing and that even no conversions are needed to go from the client layer, where the complete job is considered, to the worker layer, where a sub job is considered.

Dynamic Aspects

When processing a copy job, at first the involved client will create instances of the source and target document, initially as recipies. During processing, the source recipie will be replaced by real images and associated carriers one by one as they are scanned in. The splitter will split the job in subjobs and create intermediate instances of the document. Workers, assigned by the splitter, will access the created instances and perform their part of the job and update the model accordingly. Each time, a next step will be enabled upon change of state of the existence parameter, for each image and assoicated carrier involved. This process continues until eventually all target images and associated carriers have the existence state real and all further required target states have been reached. The desired copies have been realized then and the job is finished.

Processing of a copy job will now be described in more detail.

The document model according to the invention makes it possible to simultaneously accomodate components that are in disparate phases of processing to come from the source document to the target document.

The relation between the source document and target document is only an ImageSequence relation. The individual images in the target document specification refer to individual images in the source document.

This also holds for the steps in between, where intermediate documents are in existence, due to worker jobs that are defined by the splitter on the basis of the client job.

To determine what must be made from what, source images must be related to target images and vice versa. To be able to copy a document, a path must be found from a single sheet or bitmap to another bitmap or sheet. All attrributes to scan or print can be found in the objects that together form that path. These paths are found based on necessary transformations from images and its sequence of a document in a first state to images and its sequence of a document in a second state. To be able to relate source and target images, every image must have a locally defined sequence number. Then to relate a source image to a target image, a unique target image must be created having the same sequence number.

After adding a real image to the source document, a unique target image will be created having the same image index. If this succeeds, the target image will get the specified state. The change into the specified state will trigger for example a print worker tthat took a subscription to the target sheet.

Workers operate on the various components of the document. A scan worker detects a document, and will update a sourceRealDocument according to a Documentrecipe and will create an intermediate Doc object. A print worker sends print commands to the printer or printer engine in the order of delivery of the sheets to the finisher. Basic operations of an image manipulation worker working on images are: copying, pasting/clipping and gradation-controlling and zooming. As a matter of fact, workers change attributes of the various components. For instance, a zoom worker will work on the attribute size, and a gradation control worker will work on the attribute OD (Optical Density). Besides that, workers may also change the way in which components are structurally related to each other. This information is presented as structural attributes. Examples are: carrier plexity, number and position of images on a carrier and number of paper types. In this way, attributes define the state a component or the document as a whole is actually in. As workers change attributes, the state of the document changes and in this way a job can be considered as a collection of state transitions.

In order to extract a state, the system according to the present invention has provisions for retrieving all images in the context of a document recipe; for each image it is possible to get a pointer to a connected frame, a carrier connected to that frame, a basic document connected to that carrier; and for each of these objects it is possible to retreive the attribute values. Structural attributes are obtainable by methods of either one of the objects of the document.

Example

To illustrate the overall dynamics of the processing of a job according to the present invention, an example will now be given for the processing of a copy job. At the local user interface a user defines a new copy job. The user places the original document on the ADF and presses the start button. The scanner or the like scans the document and the printer prints the requested number of copies.

The execution of the copy job is triggered by the notification to the scheduler 110 by the SystemJobList. As a reaction, the scheduler 110 selects the new job and makes itself dependent of the copy job so that it is notified if the job changes. Then it adds the copy job to the splitter queue. The splitter 111 being dependent on the changes of the splitter queue receives a notification and selects the copy job. It reads the settings of the copy job and splits the job into two basic jobs: a scanjob and a printjob. These jobs are added to the (composite) copy job. Both jobs are placed in the SystemJobList. The scheduler 110 is notified by the SystemJobList because the ScanJob and PrintJob are added to the SystemJobList.

First the scheduler 110 selects the ScanJob and makes itself dependent, after which it puts the job in the ScanQueue at a position based on the attributes of the job, e.g. priority. The scan module is now notified by the ScanQueue. The same is done with respect to the PrintJob.

The two parallel activities start, the scan activity and print activity. The scan activity is initiated by the notification of the ScanQueue. The scan module then selects the ScanJob and makes itself dependent. Next it sets the job status to processing. The scheduler 110 being dependent will recieve a notification of this, but it will ignore the notification because it is no relevant change for the scheduler 110. Then the scanner reads the settings and executes the job. When ready the scan module sets the status of the job to the ready state and removes itself from the dependency list of the job. Now it has no relation with the job anymore and it will return to the idle state waiting for a notification from the ScanQueue. The change of job status to the ready state has notified the scheduler 110, which now removes the ScanJob from the ScanQueue.

The second activity is the print process. The notification of the print module by the PrintQueue starts the PrintJob. It is executed in a similar way as the ScanJob. Now both jobs are ready so the scheduler 110 can remove the copy job as well as the scan- and print job from the SystemJobList and removes the dependencies of these jobs. The end result is that the jobs with the ready status are only referenced by the request.

Splitting Method

Figure 5:
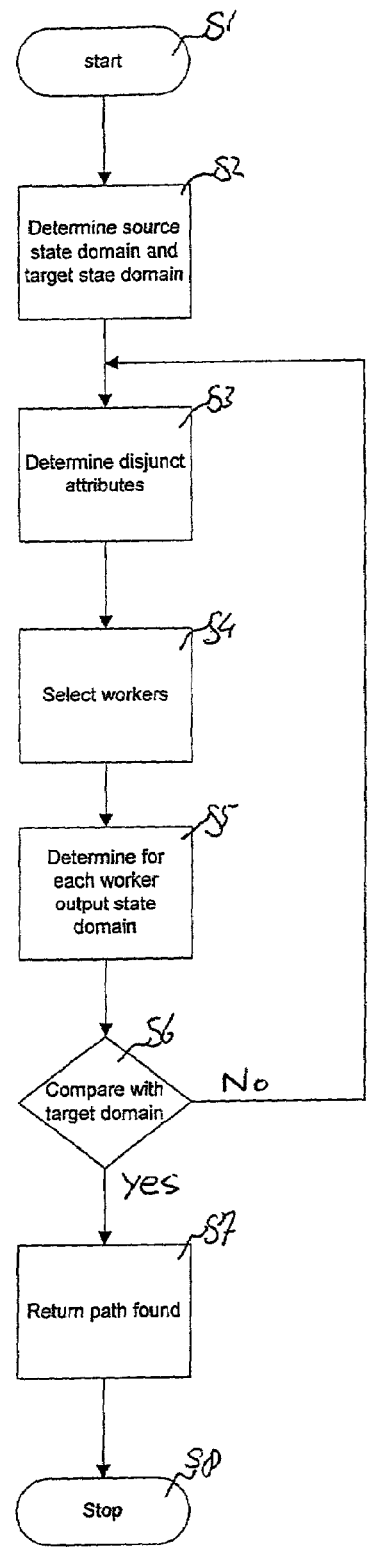
FIG. 5 is a flowchart illustrating processing steps of a method for splitting a job into subjobs according to an embodiment of the present invention.

The splitting method according to an embodiment of the present invention will now be explained with reference to FIG. 5. A client job is received by a client module. The job is placed in the SystemJobList. From there the scheduler places the job in the splitter queue. Upon notification that a job is available in its queue, the splitter takes the job from the splitter queue in step 1. In step 2 a source state and a target state are extracted from the document model. Each state is represented as a sequence of attribute values. In step 3 the source state and target state are compared and attributes with disjunct values are identified. In step 4 from a table in the information blackboard 6, where for each input domain, one or more output ranges are given together with the workers that are able to transform that input domain to the given output range, workers are identified which are able to transform the attributes that have to be transformed. Table 1 below gives an example of such a table.

In step 5, for each worker a new state is calculated. Each new state is stored in a queue of states to investigate. In step 6 this state is compared with the target state. If both states are equal to each other (Y), a path of workers has been identified in step 7 and the method stops in step 8. But, if both states are different, the method returns to step 3 where now a state taken from the queue of states to investigate is compared with the target state to identify disjunct attributes. During execution of the method, a directed graph comprising nodes representing states and edges representing workers, and the starting node representing the source state, will be formed. At the moment a new node representing the target state is reached, a path has been defined between the nodes. By using a queue for storing states to investigate, a breadth first approach is taken. In another embodiment a stack can be used for storing states to investigate. This leads to a depth first approach.

In a particular embodiment each worker has an additional cost attribute. For each state obtained during the execution of the splitting method, cumulative costs are calculated and stored for that node. When a node, already reached earlier is reached again but via another path apparently, cumulative costs are compared and the incoming edge related to the highest cumulative cost is pruned from the graph. At the moment the target node is reached, the path is reconstructable by backtracking through the graph, starting from the target node.

The splitting method according to an embodiment of the present invention will now be illustrated by a detailed example with reference to Table 1 and Table 2 below. The present example considers a copy job where 10 copies have to be made. Table 1 shows a worker table where for an attribute a possible transformation domain can be looked up and the worker in charge of this transormation is given.

TABLE 1

| attribute | Transformation | worker |
|---|---|---|
| document location | Scanner -> file | scanner |
| | external file -> file | importer |
| | file -> external file | exporter |
| | file -> printer | printer |
| N number of copies | 0 -> 1 | scanner, PDL interpreter |
| | 1 -> n | printer |
| type (carrier type) | PDL -> Bitmap | PDL interpreter |
| | paper -> Bitmap | scanner |
| | Bitmap -> paper | printer |
| dir (carrier orientation) | any -> FUN | scanner |
| | FUN -> any | printer |
| | Undefined -> FUN | PDL interpreter |
| plex (carrier plexity) | 1 -> 2 | printer |
| | 2 -> 1 | scanner |
| side (carrier-image binding) | back -> front | scanner |
| | front -> back | printer |
| | undefined -> front | PDL interpreter |
| n (number of images per carrier side) | n -> m | image manipulator |
| | undefined -> m | PDL interpreter |
| pos (position of image on carrier in units of carrier format; (0, 0) denotes upper left; (0, 1) denotes bottom left) | (x, y) -> (x', y') | image manipulator |
| | undefined -> (x', y') | PDL interpreter |
| size (image size) | (x, y) -> (x', y') | image manipulator |
| | undefined -> (x', y') | PDL interpreter |
| or (orientation of image with respect to carrier) | any -> any | image manipulator |
| | undefined -> any | PDL interpreter |

TABLE 1-continued

| attribute | Transformation | worker |
|---|---|---|
| zoom (zoom state with respect to source reference) | 1 -> any | scanner |
| | undefined -> any | PDL interpreter |

A source state domain and a target state domain are presented in Table 2. The attributes such as loc, N and dir have to be changed. So from Table 1, workers are selected that are able to transform these attributes. This yields that the scanner worker is able to transform the the identified attributes.

Next it is calculated how the state domain is transformed by the worker in a new state domain. The new state domain is presented in Table 2 at line 3. This state domain is compared with the target domain and it is found that a compliance is not yet reached. The attributes distinct from attributes of the target state are then determined. And a worker that is able to work on these attributes is looked up in Table 1.

TABLE 2

| | STATES | | | | | | | | | | |
|---|---|---|---|---|---|---|---|---|---|---|---|
| Line | loc | N | type | dir | plex | side | n | pos | size | or | zoom |
| 1. source | scan | 0 | paper | FDN | 1 | F | 1 | (0, 0) | A4 | N | 100 |
| 2. target | print | 10 | paper | FUN | 1 | F | 1 | (0, 0) | A4 | N | 100 |
| 3. interm. | file | 1 | BM | FUN | 1 | F | 1 | (0, 0) | * | N | * |

In this example, the worker that is able to transform these attributes is the printer worker. So the printer worker is selected next in the path. Transformation of the printer worker leads to the target state. So a path of needed workers has been found by the splitter. Subjobs for these workers are formulated and placed in the SystemJobList on the information black board.

The method according to the present invention also accomodates situations where more than one source state is available, e.g., where a document has to be merged with a logo available in a separate image file.

The method according to the present invention also accomodates situations where subjobs are processed in parallel. The path in such case has the form of a digraph, instead of a mere sequence of subjobs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A system for carrying out jobs on documents, comprising:
transformation units that, in cooperation, generate a target document from a source document for carrying out a job, wherein a document is stored according to a document model as a structure of components, a component has a component state assigned, and a document has a document state assigned, the document state comprising component states, the transformation units having the ability to bring a component from a first component state into a second component state;

means for composing a digraph of transformation units that is able to transform components of a document in such a way that the document is brought from a source document state to a target document state; and means for managing processing of components by the transformation units according to the digraph of transformation units.

2. The system according to claim 1, wherein at least one of the transformation units is defined by a set of input states and a set of output states, and the means for composing the digraph, where edges represent the transformation units and nodes represent states of components, handles sets of states for each node.

3. The system according to claim 1, wherein one of the transformation units has a cost attribute, and the means for composing the digraph includes means for calculating total costs of the digraph based on the cost attributes of transformation units comprised in the digraph and means for returning a digraph with minimum total costs.

4. The system according to claim 1, further comprising:

clients for inputting a document and a job to be carried out on the document, wherein the means for composing the digraph carries out the following steps:

determining the state of components making up the source document, determining the state of components making up the target document, identifying attributes that have to be changed, identifying transformation units that change at least one of the identified attributes, and determining the resulting set of states.

5. The system of claim 4, wherein the means for composing the digraph caries out the steps of:

comparing the resulting set of states with the state of components making up the target document, repeating the identifying steps and the comparing step until the comparison is fulfilled, and returning a resulting digraph of transformation units.

6. The system of claim 1, wherein the transformation units include workers.

7. The system of claim 1, wherein the means for composing the digraph includes a splitter.

8. A system for carrying out jobs on documents, comprising: transformation units that generate a target document from a source document for carrying out a job, wherein a document is stored according to a document model, a component has an assigned component state, and a document has an assigned document state, the document state comprising component states, the transformation units being capable of transforming a component from a first component state to a second component state;

a first section to compose a digraph of transformation units that is able to transform components of a document in such a way that the document is brought from a source document state to a target document state; and a second section to manage processing of components by the transformation units according to the digraph of transformation units.

9. The system according to claim 8, wherein at least one of the transformation units is defined by a set of input states and a set of output states, and the first section handles sets of states for each node where edges represent the transformation units and nodes represent states of components.

10. The system according to claim 8, wherein one of the transformation units has a cost attribute, and the first section includes a first subsection to calculate total costs of the digraph based on the cost attributes of transformation units and a second subsection to return a digraph with minimum total costs.

11. The system of claim 8, wherein the transformation units include workers.

* * * * *